United States Patent Office
3,156,687
Patented Nov. 10, 1964

3,156,687
N-(N-HIGHER ALIPHATIC HYDROCARBON AMINO-PROPYL)-MORPHOLINES
Donald L. Andersen, Minneapolis, and Jean B. Thielen, St. Paul, Minn., assignors to General Mills, Inc., a corporation of Delaware
No Drawing. Filed Nov. 27, 1961, Ser. No. 155,199
9 Claims. (Cl. 260—247.2)

This invention relates to novel substituted morpholine compounds.

It is an object of this invention to provide novel substituted morpholine compounds. It is another object of this invention to provide novel morpholine compounds which are highly effective corrosion inhibitors. Other objects will appear hereinafter.

The objects of this invention are accomplished by substituted morpholine compounds and the readily hydrolyzable salts thereof wherein said substituted morpholine compounds are selected from the group consisting of compounds of the structural formula:

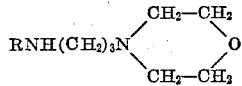

and

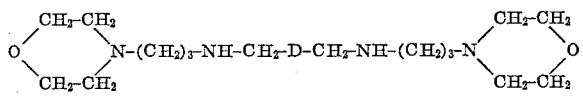

where R is an aliphatic hydrocarbon radical of 8–24 carbon atoms and D is a dimeric fat radical.

The morpholine compounds of the present invention are generally liquid at room temperature. The salts are normally soft solids which readily form clear water solutions. The partial salts of these compounds are readily soluble in isopropyl alcohol and these isopropyl alcohol solutions are easily dispersed in water. The compounds of the present invention are also readily soluble in fuel oil and act to prevent sludges and stabilize color as well as acting as corrosion inhibitors.

Compounds of the present invention are prepared by reacting an N-fatty propylene diamine with β,β'-dichloroethyl ether as illustrated below:

$$RNH(CH_2)_3NH_2 + (ClCH_2CH_2)_2O \xrightarrow{NaOH}$$

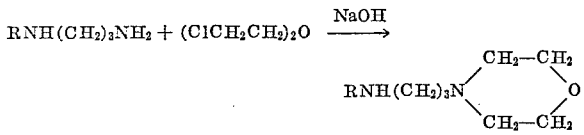

The reaction is carried out by heating a mixture of the N-fatty propylene diamine and dichloroethyl ether in the presence of sodium hydroxide. The sodium hydroxide neutralizes the hydrochloric acid by-products and drives the reaction to completion. Generally, some excess of sodium hydroxide is desirable. Typically, the reaction is carried out at temperatures in the range of 100° to 150° C. for a period of 5 to 10 hours.

The N-fatty propylene diamines employed as starting materials in the present invention are readily prepared by reacting a fatty amine with acrylonitrile to produce a cyanoethyl aliphatic amine which can then be hydrogenated to produce the N-aliphatic substituted propylene diamine. Suitable fatty amines include octyl amine, decyl amine, palmityl amine, tallow amine, coco amine, stearyl amine, oleyl amine and linoleyl amine.

The dimorpholine compound of the present invention is prepared by the reaction scheme similar to that illustrated above except that the dimeric fat tetramine is substituted for the N-propylene diamine. The preparation of the dimeric fat tetramine is similar to the preparation of the N-fatty propylene diamines. A dimeric fat amine is reacted with acrylonitrile to produce a cyanoethylated product which is subsequently hydrogenated to produce the dimeric fat tetramine. The reaction scheme is illustrated by the following equation:

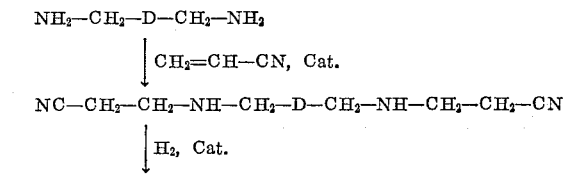

where D is a dimeric fat radical. When the dimeric tetramine is reacted with the β,β'-dichloroethyl ether, there is obtained a dimorpholino compound of the structure:

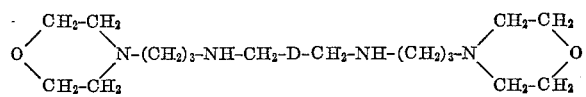

where D is a dimeric fat radical.

The dimeric fat amines starting materials for preparing the dimeric products of the present invention are the diamines prepared by the amination of dimerized fat acids. Relatively pure dimerized fat acids can be distilled from commercially available polymeric fat acid mixtures. The term "polymeric fat acid" as used herein refers to a polymerized fat acid. The term "fat acid" as used herein refers to naturally occurring and synthetic monobasic aliphatic acids having hydrocarbon chains of 8–24 carbon atoms. The term "fat acids" therefore, includes saturated, ethylenically unsaturated, and acetylenically unsaturated acids. The term "polymeric fat radical" is generic to the divalent, trivalent, and polyvalent hydrocarbon radicals of dimerized fat acids, trimerized fat acids, and higher polymers of fat acids, respectively. These divalent and trivalent radicals are referred to herein as "dimeric fat radical" and "trimeric fat radical."

The saturated, ethylenically unsaturated, and acetylenically unsaturated fat acids are generally polymerized by somewhat different techniques, but because of the functional similarity of the polymerization products, they all are generally referred to as "polymeric fat acids."

Saturated fat acids are difficult to polymerize but polymerization can be obtained at elevated temperatures with a peroxidic catalyst such as di-t-butyl peroxide. Because of the low yields of polymeric products, these materials are not commercially significant. Suitable saturated fat acids include branched and straight acids such as caprylic acid, pelargonic acid, capric acid, lauric acid, myristic acid, palmitic acid, isopalmitic acid, stearic acid, arachidic acid, behenic acid, and lignoceric acid.

The ethylenically unsaturated acids are much more readily polymerized. Catalytic or non-catalytic polymerization techniques can be employed. The non-catalytic polymerization generally requires a higher temperature.

Suitable catalysts for the polymerization include acid or alkaline clays, di-t-butyl peroxide, boron trifluoride and other Lewis acids, anthraquinone, sulfur dioxide and the like. Suitable monomers include the branched straight chain, poly and mono ethylenically unsaturated acids such as 3-octenoic acid, 11-dodecanoic acid, linderic acid, lauroleic acid, myristoleic acid, tsuzuic acid, palmitoleic acid, petroselinic acid, oleic acid, elaidic acid, vaccenic acid, gadoleic acid, cetoleic acid, nervonic acid, linoleic acid, linolenic acid, eleostearic acid, hiragonic acid, moroctic acid, timnodonic acid, eicosatetraenoic acid, nisinic acid, scoliodonic acid and chaulmoogric acid.

The acetylenically unsaturated fat acids can be polymerized by simply heating the acids. Polymerization of these highly reactive materials will occur in the absence of a catalyst. The acetylenically unsaturated acids occur only rarely in nature and are expensive to synthesize. Therefore, they are not concurrently of commercial significance. Any acetylenically unsaturated fat acid, both straight chain and branched chain, both mono-unsaturated and polyunsaturated, are useful monomers for the preparation of the polymeric fat acids. Suitable examples of such materials include 10-undecynoic acid, tariric acid, stearolic acid, behenolic acid, and isamic acid.

Because of their ready availability and relative ease of polymerization, oleic and linoleic acid are the preferred starting materials for the preparation of the polymeric fat acids.

If desired, polymeric fat acids which contain unsaturation can be hydrogenated to form substantially saturated polymeric fat acids. Salts of the substituted morpholines are prepared by contacting the morpholine compounds with a salt-forming compound. Generally, elevated temperatures are not necessary to effect the reaction; however, where either of the reactants is normally solid, the temperature should be elevated to melt the solid. Alternatively, the reaction can be carried out in a mutual solvent. The salt-forming materials are those acid compounds generally used to form amine salts. Typical materials are the inorganic acids, such as hydrochloric acid and sulfuric acid; the carboxylic acids, such as acetic acid, lauric acid, maleic acid, phthalic acid, stearic acid, and benzoic acid; the phenols, such as phenol, dodecyl phenol, nonyl phenol, and hydroquinone; the organic sulfonates, such as dodecyl benzene sulfonate and ethyl sulfonate; the amino acids such as glutamine, arginine, and glycine; and the phosphoric acids, such as phenyl phosphoric acid.

As used herein, the term "fatty" means aliphatic hydrocarbon groups of 8–24 carbon atoms.

This application is a continuation-in-part of our U.S. patent application, Serial No. 765,299, filed October 6, 1958, now U.S. Letters Patent 3,019,196.

The present invention is further illustrated by the following examples. Unless otherwise specified all parts and percentages used herein are by weight.

*Example I*

Into a 1 liter stirred flask was charged 319 grams of N-tallow amino propylamine, 157.3 grams of $\beta,\beta'$-dichloroethyl ether and 88 grams of sodium hydroxide as a 50% aqueous solution. The reaction mixture was heated under reflux conditions for a total of 6 hours. The water and unreacted dichloroethyl ether were stripped from the reaction mixture by heating to 180° C. under a slight vacuum. The remaining mixture was then filtered to remove the by-product sodium chloride and any excess sodium hydroxide. There was recovered 1-(N-morpholino)-3-tallow amino propane. This product was a clear yellow orange liquid. The product was converted into the acetate salt by contacting the 1-(N-morpholino)-3-tallow amino propane with an excess of acetic acid. There was obtained a soft solid product.

*Example II*

Into a 1 liter stirred flask was charged 250 grams of N-coco propylene diamine, 157.3 grams of $\beta,\beta'$-dichloroethyl ether, and 88 grams of sodium hydroxide as a 50% aqueous solution. After heating the reaction mixture at reflux temperatures for a total of 6 hours, the water and excess ether were stripped from the reaction mixture by heating the mixture to 180° C. The stripped product was then filtered to remove sodium chloride and excess sodium hydroxide. There was obtained a clear yellow liquid containing approximately 90% of the desired 1-(N-morpholino-3-coco amino propane). The product had a total amine number of 295, a tertiary amine number of 178, a secondary amine number of 92, a primary amine number of 25 and contained 0.2% moisture.

*Example III*

Into a 1 liter stirred flask were charged 250.8 grams of a mixture containing 70% N-lauryl propylene diamine and 30% N-myristyl propylene diamine, 157.3 grams of $\beta,\beta'$-dichloroethyl ether and 88 grams of sodium hydroxide as a 50% aqueous solution. After heating the reaction mixture for 6 hours at reflux temperatures, there was recovered a mixture of 1-(N-morpholino)-3-lauryl amino propane and 1-(N-morpholino)-3-myristyl amino propane having a total amine number of 313.4, a primary amine number of 36.1, secondary amine number of 102.5, a tertiary amine number of 174.8, and 0.34% moisture.

*Example IV*

Into a 1 liter stirred flask were charged 340 grams of N-(hydrogenated tallow) propylene diamine which contained approximately 70% of N-stearyl propylene diamine and 30% N-palmityl propylene diamine, 157.3 grams of $\beta,\beta'$-dichloroethyl ether, and 88 grams of sodium hydroxide as a 50% aqueous solution. After heating the reaction mixture for 6.5 hours at reflux temperature there was obtained a product having a total amine number of 247.9, a primary amine number of 18.0, a secondary amine number of 90.3, and a tertiary amine number of 139.6.

*Example V*

Into a 1 liter stirred flask were charged 313 grams of the tetramine of the formula:

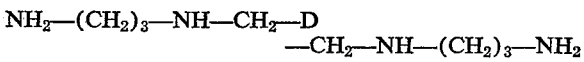

where D is the dimeric fat radical of dimerized linoleic acid, 157.3 grams of $\beta,\beta'$-dichloroethyl ether, and 88 grams of sodium hydroxide. After heating at reflux temperature for 6 hours there was recovered the morpholino compound of the formula:

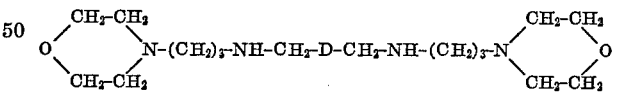

where D is a dimeric fat radical.

Substantially the same results are obtained by substituting any other N-fatty propylene diamines as starting materials in the present examples. A variety of amine salts can be prepared by contacting various acids with the products of the present invention.

The foregoing examples have been included as illustrations of preferred embodiments in the present invention and are not be construed as limitations on the scope thereof.

The products of the present invention are useful as corrosion inhibitors.

The embodiments of the present invention in which an exclusive property or privilege is claimed are defined as follows:

1. A compound selected from the group consisting of

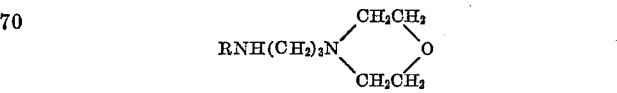

where R is an aliphatic hydrocarbon radical having from 8 to 24 carbon atoms and the acid addition salts thereof.

2. A compound selected from the group consisting of

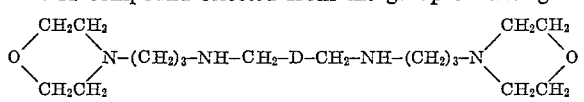

in which D is the divalent hydrocarbon radical of a dimeric fat acid obtained from the polymerization of a fat acid having from 8 to 24 carbon atoms and the acid addition salts thereof.

3. 1-(N-morpholino)-3-tallow amino propane.
4. 1-(N-morpholino)-3-coco amino propane.
5. 1-(N-morpholino)-3-stearyl amino propane.
6. 1-(N-morpholino)-3-myristyl amino propane.
7. 1-(N-morpholino)-3-lauryl amino propane.
8. 1-(N-morpholino)-3-palmityl amino propane.
9. The acetate salt of 1-(N-morpholino)-3-tallow amino propane.

References Cited in the file of this patent

UNITED STATES PATENTS 3,019,196   Andersen et al. _____ Jan. 30, 1962

FOREIGN PATENTS 733,300   Germany _____ Mar. 24, 1943
583,321   Belgium _____ May 10, 1959